(12) United States Patent
Busaba et al.

(10) Patent No.: US 9,130,740 B2
(45) Date of Patent: *Sep. 8, 2015

(54) VARIABLE ACKNOWLEDGE RATE TO REDUCE BUS CONTENTION IN PRESENCE OF COMMUNICATION ERRORS

(71) Applicant: INTERNATIONAL BUSINESS MACHINES CORPORATION, Armonk, NY (US)

(72) Inventors: Fadi Y. Busaba, Poughkeepsie, NY (US); Steven R. Carlough, Wappingers Falls, NY (US); Christopher A. Krygowski, Lagrangeville, NY (US); Brian R. Prasky, Wappingers Falls, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 249 days.

This patent is subject to a terminal disclaimer.

(21) Appl. No.: 13/784,275

(22) Filed: Mar. 4, 2013

(65) Prior Publication Data

US 2013/0290803 A1    Oct. 31, 2013

Related U.S. Application Data

(63) Continuation of application No. 13/458,522, filed on Apr. 27, 2012, now Pat. No. 8,904,246.

(51) Int. Cl.
*G06F 11/00* (2006.01)
*H04L 1/08* (2006.01)
(Continued)

(52) U.S. Cl.
CPC .............. *H04L 1/08* (2013.01); *H04L 1/1864* (2013.01); *H04L 2001/0094* (2013.01)

(58) Field of Classification Search
CPC .. H04L 1/08; H04L 1/1864; H04L 2001/0094
USPC .................... 370/445; 714/748, 704, 708, 705
See application file for complete search history.

(56) References Cited

U.S. PATENT DOCUMENTS 5,551,068 A * 8/1996 Goldsmith et al. .......... 370/466
5,669,014 A   9/1997 Iyengar et al.
(Continued)

FOREIGN PATENT DOCUMENTS

CN    1992579 A     7/2007
CN    101383683 A   3/2009
CN    101958775 A   1/2011

OTHER PUBLICATIONS

"z/Architecture Principles of Operation," IBM® Publication No. SA22-7832-08, Ninth Edition, Aug. 2010, pp. 1-1496.

(Continued)

*Primary Examiner* — David Ton
(74) *Attorney, Agent, or Firm* — Margaret McNamara, Esq.; Blanche E. Schiller, Esq.; Heslin Rothenberg Farley & Mesiti P.C.

(57) ABSTRACT

A variable write back indicator control is provided to control the amount of data to be re-transmitted when a packet error occurs. A hardware controller obtains an indication that an acknowledge rate or an amount of set write back indicators of a data frame is to be adjusted. The indication is based on an error rate of data transmission over a communication bus. Based on obtaining the indication that the amount of set write back indicators is to be adjusted, one or more write back indicators are adjusted.

13 Claims, 6 Drawing Sheets

(51) Int. Cl.
H04L 1/18 (2006.01)
H04L 1/00 (2006.01)

(56) References Cited

U.S. PATENT DOCUMENTS

| | | | |
|---|---|---|---|
| 5,918,174 A * | 6/1999 | Chennakeshu et al. | 455/427 |
| 5,933,763 A * | 8/1999 | Wang et al. | 340/7.22 |
| 6,154,489 A * | 11/2000 | Kleider et al. | 375/221 |
| 6,425,105 B1 | 7/2002 | Piirainen et al. | |
| 6,745,360 B1 * | 6/2004 | Srinivas et al. | 714/748 |
| 6,894,974 B1 * | 5/2005 | Aweva et al. | 370/230.1 |
| 7,017,032 B2 | 3/2006 | Wilson | |
| 7,385,976 B2 | 6/2008 | Gu et al. | |
| 7,706,397 B2 | 4/2010 | Trainin et al. | |
| 7,945,835 B2 | 5/2011 | Roh et al. | |

OTHER PUBLICATIONS

Office Action for U.S. Appl. No. 13/458,522 dated Feb. 21, 2014, pp. 1-8.
International Search Report for PCT/IB2013/053064 dated Sep. 19, 2013, pp. 1-10.
Busaba et al., "Variable Acknowledge Rate to Reduce Bus Contention in Presence of Communication Errors," U.S. Appl. No. 13/458,522, filed Apr. 27, 2012, pp. 1-30.

* cited by examiner

VARIABLE ACKNOWLEDGE RATE TO REDUCE BUS CONTENTION IN PRESENCE OF COMMUNICATION ERRORS

This application is a continuation of co-pending U.S. Pat. No. 8,904,246B2, entitled "VARIABLE ACKNOWLEDGE RATE TO REDUCE BUS CONTENTION IN PRESENCE OF COMMUNICATION ERRORS," issued Dec. 2, 2014, which is hereby incorporated herein by reference in its entirety.

BACKGROUND

An aspect of the invention relates, in general, to communication within a computing environment, and in particular, to managing the rate at which the receipt of data is acknowledged.

A typical transmission protocol requires information, such as a frame of data, to be sent, by a sender, in separate packets. Each packet can include a bit, referred to as a write back bit, that when set informs the receiver of the packet to acknowledge that the packet has arrived. The receiver sends an acknowledge packet to the sender that indicates whether the packets sent since the previous acknowledge have all arrived error free. Transmission of this acknowledge to the sender requires bandwidth on the bus to be consumed while transferring no real data.

This acknowledge bandwidth can be reduced by including a set write back bit in only the last packet of the frame, such that only one acknowledge per frame is required. This reduces the number of write back acknowledge packets to be sent, but causes the entire frame to be re-transmitted, when an error occurs in one or more packets of the frame.

BRIEF SUMMARY

Shortcomings of the prior art are overcome and additional advantages are provided through the provision of a method of facilitating communications in a computing environment. The method includes, for instance, obtaining, by a hardware controller, an indication that an amount of set write back indicators of a data frame is to be adjusted, the indication based on an error rate of data transmission over a communication bus of the computing environment; and adjusting one or more write back indicators based on obtaining the indication.

In a further aspect, a method of facilitating communications in a computing environment is provided. The method includes, for instance, determining, at a selected time by a hardware controller, based on an error rate of data transmission over a communication bus of the computing environment that a rate at which data received by the hardware controller is to be acknowledged is to be adjusted; and providing an indication by the hardware controller that the rate is to be adjusted.

Computer systems and computer program products relating to one or more aspects of the present invention are also described and may be claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, a variable write back indicator control is provided to control the rate at which the receipt of data is acknowledged, and therefore, the amount of data that is to be re-transmitted when a packet error occurs. The variable write back indicator control dynamically determines how many write back indicators (e.g., bits) are to be set in a frame, and sets those indicators.

Previously, in many environments, every packet in a frame contained a set write back bit, requiring an acknowledgment from a receiver that each packet arrived error free. The overhead required by having a receiver acknowledge each packet transmission limits the throughput available to transmit the data in the frame from the transmitter to the receiver. Likewise in other environments, only the last packet of a data frame contained a write back bit, and therefore, if an error occurred during transmission, the entire frame would be re-transmitted. In a noisy environment or on buses that push the data transmittal limits of the hardware, data re-transmission from errors can cause significant decreases in effective bandwidth. Thus, to reduce the amount of data that is to be re-transmitted when a packet error occurs in a frame, in accordance with an aspect of the present invention, a variable write back indicator control is used, which controls the amount of data that is to be re-transmitted. For instance, if two packets in the frame include write back indicators, then only half of the frame (the half containing the error) is re-transmitted. Likewise, if three packets in the frame include write back indicators, then only a third of the frame is retransmitted, when an error occurs, and so forth.

Figure 1:
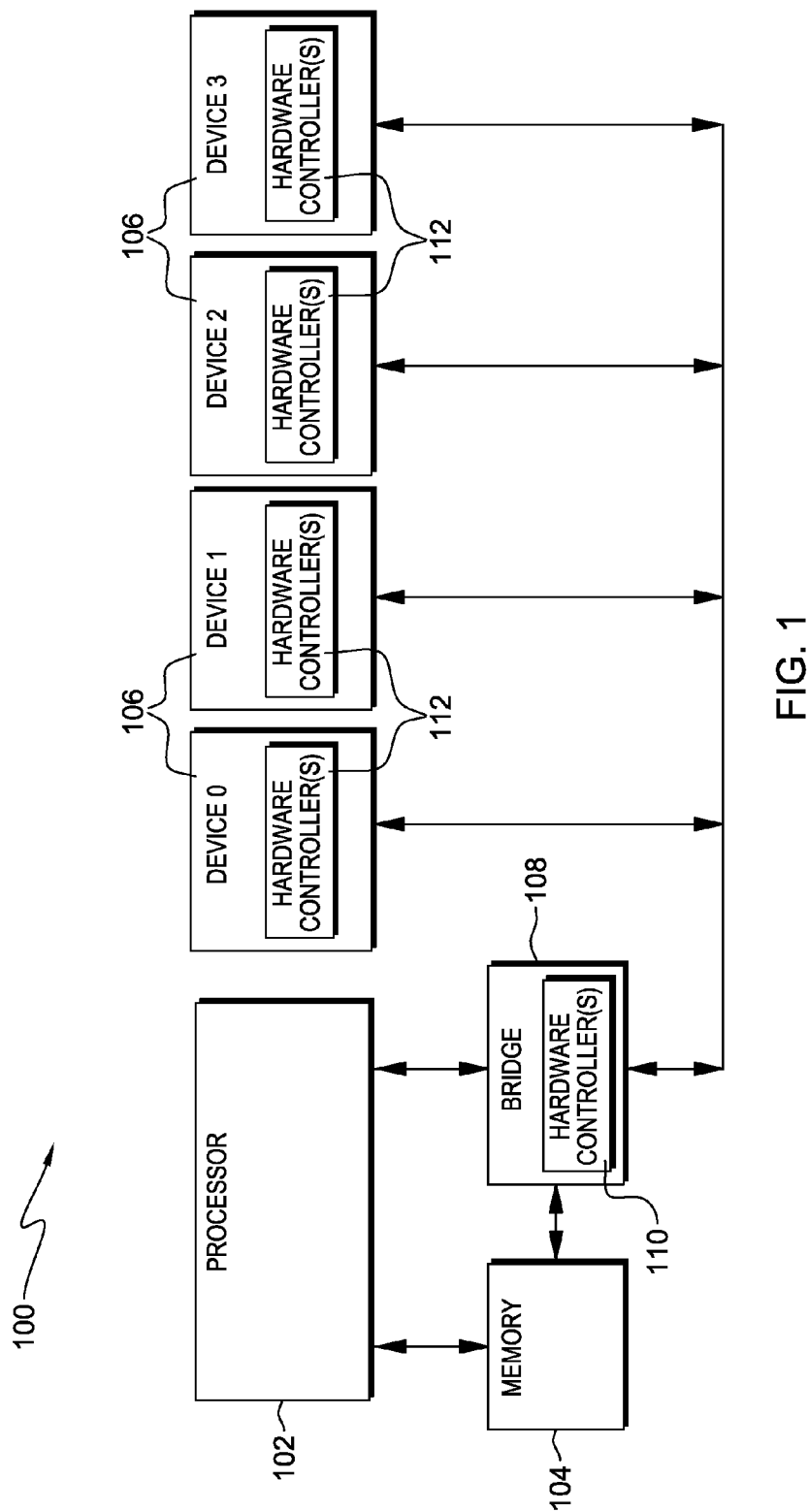
FIG. 1 depicts one embodiment of a computing environment to incorporate and use one or more aspects of the present invention.

One embodiment of a computing environment to incorporate and use one or more aspects of the present invention is described with reference to FIG. 1. In one example, a computing environment 100 includes one or more processors 102 coupled to memory 104 and to one or more input/output (I/O) devices 106 via at least one bridge 108.

In one example, processor 102 is based on the z/Architecture, and is part of a server, such as the System z server, which implements the z/Architecture. The z/Architecture and System z are offered by International Business Machines Corporation, Armonk, N.Y. One embodiment of the z/Architecture is described in an IBM® publication entitled, "z/Architecture Principles of Operation," IBM® Publication No. SA22-7832-08, Ninth Edition, August, 2010, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation, Armonk, N.Y., USA. Other names used herein may be registered trademarks, trademarks, or product names of International Business Machines Corporation or other companies.

In other examples, processor 102 is based on architectures other than the z/Architecture, such as but not limited to, the Power architecture offered by International Business Machines Corporation; an Intel architecture offered by Intel Corporation; etc.

Figure 2:
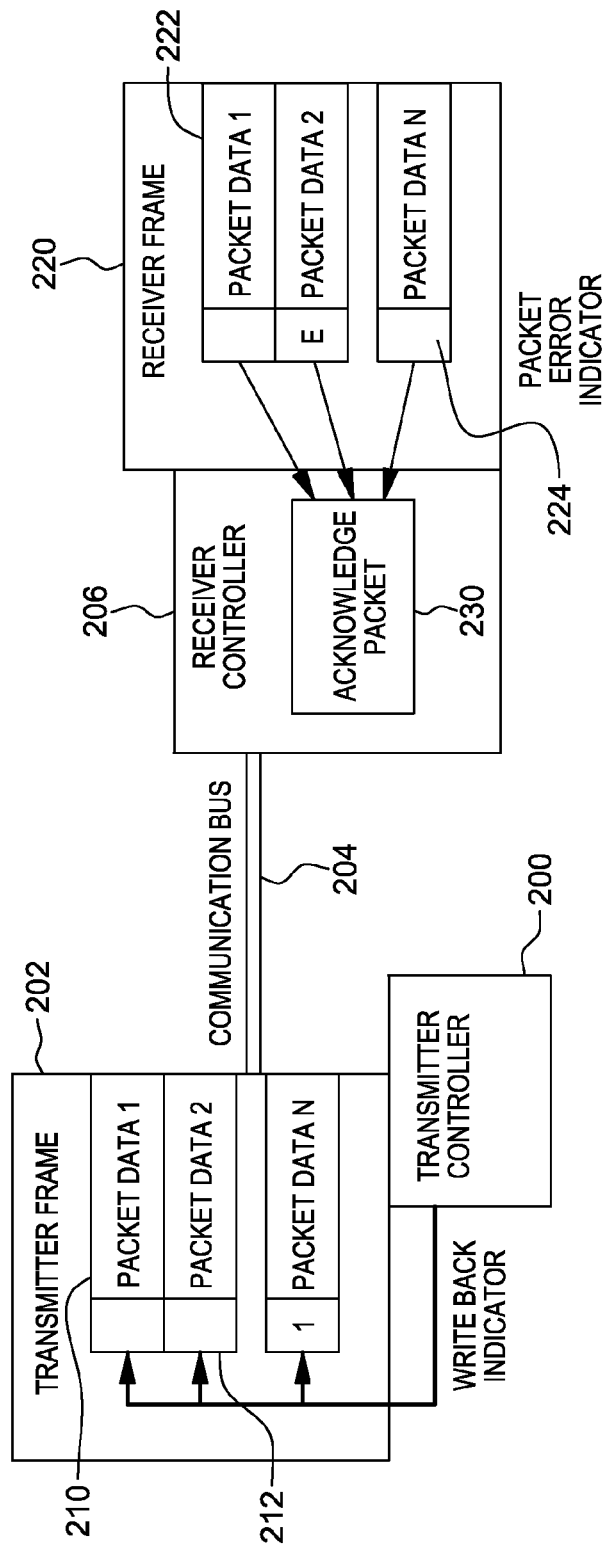
FIG. 2 depicts one example of communication between a transmitter controller and a receiver controller included within the computing environment of FIG. 1, in accordance with an aspect of the present invention.

Bridge 108 includes or is coupled to, for instance, at least one hardware controller 110 for transmitting/receiving data communications. Likewise, each I/O device 106 includes or is coupled to at least one hardware controller 112 for receiving/transmitting data communications. Further details regarding the hardware controllers are described with reference to FIG. 2.

One hardware controller 110 included within or coupled to, for instance, bridge 108 is a transmitter controller 200 (a.k.a., transmitter or sender) used in transmitting data frames from, for instance, processor 102 to I/O devices 106. Transmitter controller 200 transmits transmitter frames 202 across a communication bus 204 to a receiver controller 206 (a.k.a., receiver), which is one of hardware controllers 112 located, for instance, in an I/O device (or coupled thereto). Transmitter frame 202 includes one or more data packets 210, and each data packet 210 (or a subset thereof) includes a write back indicator. In this example, the write back indicator for the last packet of the frame is set (e.g., to 1). Thus, in this example, only one acknowledge packet is sent after the entire frame is received by the receiver, and if an error is encountered in one of the packets, the entire frame is re-transmitted.

In a further embodiment, one or more of the data packets does not include a write back indicator. For instance, if a write back indicator is not to be set in a data packet, then the data packet does not include a write back indicator, at all.

Receiver controller 206 receives the transmitter frame over the communication bus into a receiver frame 220. Receiver frame 220 includes one or more data packets 222, and each data packet (or a subset thereof) includes a packet error indicator 224. In this example, when the receiver controller receives all of the packets of the frame, it sends an acknowledge packet 230 back over the communication bus to the transmitter controller. Since, in this example, one of the data packets has an error ("E" in one of the error indicators), the acknowledge packet indicates an error to the transmitter controller causing the transmitter controller to resend the entire frame.

As used herein, a communication bus is any mechanism used to transmit data, including, but not limited to, a bus, a channel, a link, etc.

In accordance with an aspect of the present invention, to reduce the amount of data retransmitted when an error occurs, and to provide a balance between use of the communication bus for packet acknowledgments and data transmittal, a capability is provided for dynamically adjusting the number of set write back indicators for a frame, as described herein.

As an example, an optimal number of acknowledge packets sent to the transmitter controller by the receiver controller for a frame received by the receiver controller depends on several factors, including, for instance, the overhead incurred by the transmittal of each acknowledge packet and the transmission error rate (e.g., bit error rate) of the communication bus. In one example, for a system with a typical acknowledge overhead, the optimal transmission size between acknowledges is a transmission that has between a 75% and an 85% chance of successful transmission at a given noise level. As such, if a particular receiver controller started seeing fewer than, for instance, 3 out of 4 successful transmissions (a successful transmission being all packets between acknowledges sent with no errors), it would inform the transmitter controller to add another write back indicator to the frame (e.g., set another write back indicator to 1).

In one embodiment, the transmitter controller selects the write back indicator to be set. For instance, if only one indicator is currently set at the end of the frame and a second indicator is to be set, then the transmitter controller may set another write back indicator about halfway through the frame. Further, in another example, the transmitter controller may reorganize the write back indicators in the frame to appropriately accommodate the additional write back indicator. For instance, if there are already two set indicators and a third write back indicator is being set, then the transmitter controller may turn off one or more indicators and set others, such that there is a set indicator about every ⅓ number of packets.

By setting another write back indicator, an additional acknowledge packet is sent, thereby increasing the probability of successful transmissions between acknowledges because each transmission now contains fewer total bits between acknowledges. The receiver controller would continue informing the transmission controller to continue adding write back indicators to the frame until it detects the transmissions for the frame have fewer than, for instance, one error in four transmissions.

If, however, in a further embodiment, the receiver controller detects that there are fewer than, for instance, one error in six transmissions, a signal is sent to the transmitter controller to remove one write back indicator per frame. The transmitter controller resets one of the write back indicators (e.g., set to 0). Further, in one example, the transmitter controller reorganizes the write back indicators in the frame to appropriately accommodate fewer write back indicators. For example, if the frame now has two write back indicators, instead of three, then indicators would be set, for instance, halfway through the frame and at the end of the frame, instead of in thirds. Since the frame includes one fewer write back indicators, one fewer acknowledge packets is sent, and thereby the probability of successful transmissions between acknowledges is decreased because each transmission now contains more bits. This decreased success rate comes with the benefit of fewer acknowledge packets being sent, and therefore, less overall bits being sent and greater bus performance. The number of write back indicators continues to decrease, in one example, until the receiver controller detects, for instance, an average of one transmission in six being in error.

The example lower bound threshold of one in four and the example upper bound threshold of one in six are example threshold values. Other examples may be used, and further, one or more of the threshold values are programmable and tunable to maximize overall system performance. For example, an analysis for a system with a very small acknowledge packet overhead may find that the optimal lower bound threshold is nine out of ten, and therefore, would tend to keep more write back indicators on (and therefore have more acknowledges) than would a system with the same transmission error rate (also referred to as error rate) on the bus, and same frame size, but with larger acknowledge packet overhead. Likewise, the upper bound threshold used to reduce the number of set write back indicators would also be greater. As such, one or both of these thresholds are adjustable and are varied dynamically during system operation to tune the system to maximize bus performance under changing system conditions.

Further details regarding a variable write back control are described with reference to FIGS. 3-4. In particular, FIG. 3 depicts one embodiment of the logic to dynamically (e.g., during real-time based on current system conditions) adjust the number of write back indicators that are set in a frame; and FIG. 4 depicts one embodiment of the logic used to dynamically tune one or more of the thresholds used in the dynamically adjusting.

Figure 3:
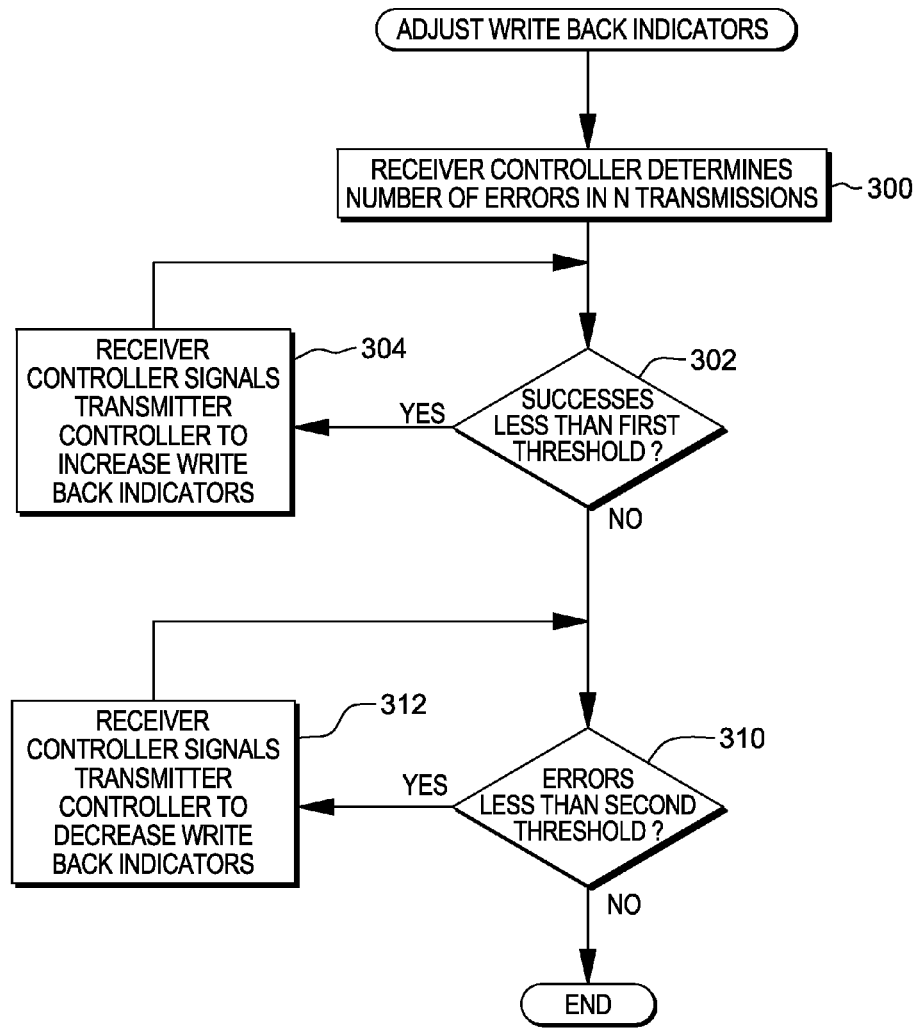
FIG. 3 depicts one embodiment of the logic to dynamically adjust the acknowledge rate of communications, in accordance with an aspect of the present invention.
Figure 4:
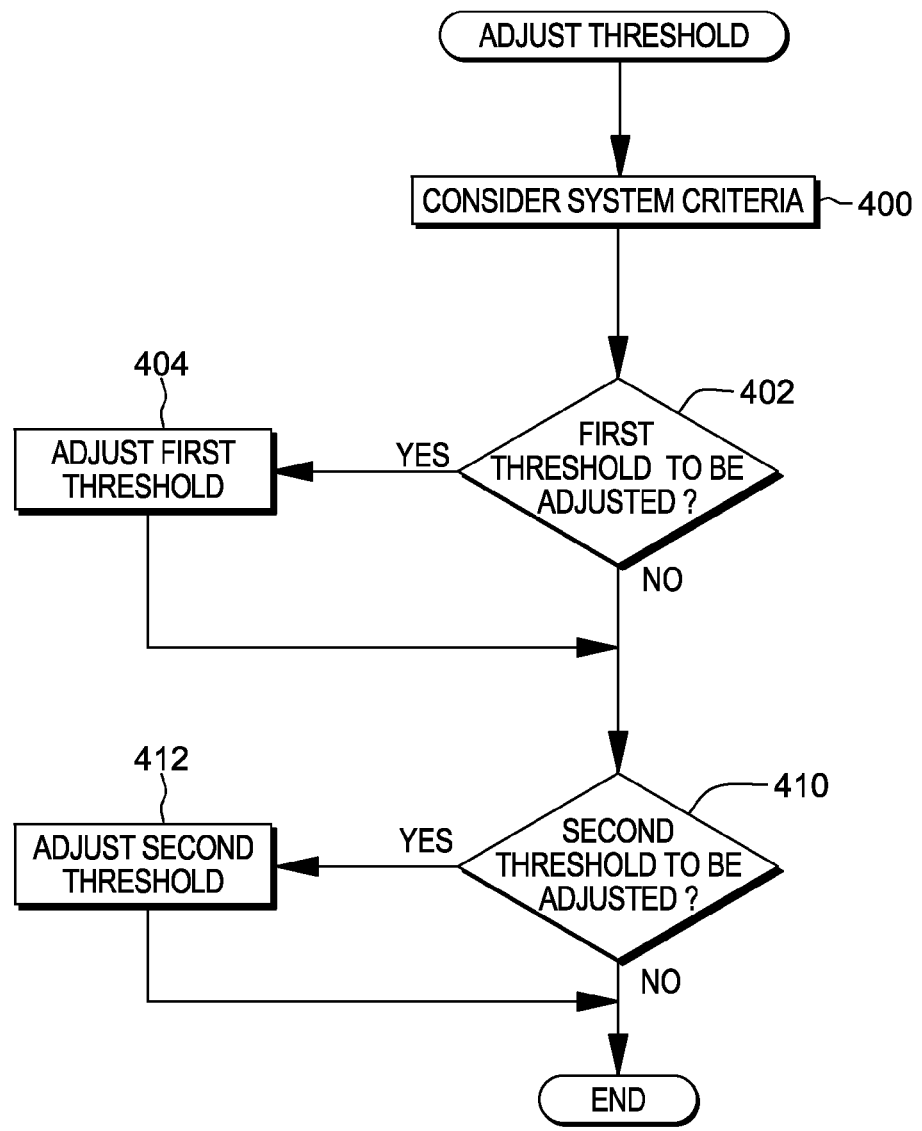
FIG. 4 depicts one embodiment of the logic to adjust thresholds used in dynamically adjusting acknowledge rates, in accordance with an aspect of the present invention.

Referring to FIG. 3, in one embodiment, the receiver controller determines an error rate for transmission, such as the number of errors in a time period (e.g., in a predefined number (N) of transmissions), STEP 300. The number of errors is converted, in one example, to a percentage of failures and/or successes to facilitate analysis. For instance, if 1 in 5 packets is in error, then the failure rate is 20% and the success rate is 80%. These percentage values may be used in comparisons with one or more thresholds to determine whether an adjustment is to be made.

In a further embodiment, the error rate may be an average of the number of errors over a selected number of time periods. As used herein, error rate refers to any representation of the error rate, including but not limited to, the number of errors in N transmissions, the failure rate, the success rate, etc.

Next, a determination is made by the receiver controller whether the percentage of successes in that time period is less than a first threshold (e.g., lower bound success threshold), INQUIRY 302. For example, a determination is made as to whether there is fewer than, for instance, 75% successful transmissions, in which 75% is the first threshold. (In other examples, other thresholds may be used.) If the success rate is less than (or less than or equal to, in another embodiment) the first threshold, then the receiver controller signals the transmitter controller to increase the number of write back indicators, STEP 304. That is, the transmitter controller sets at least one additional write back indicator to increase the frequency in which acknowledgements are sent back. The indicator(s) to be set is determined by the transmitter controller, and depends on, for instance, the total number of indicators set and a preferred spacing between acknowledgments.

In a further embodiment, the lower bound threshold may be based on failures, instead of successes. For instance, the failure rate of, for example, 20%, is compared to the lower bound threshold of, for instance, 25%. If the failure rate is greater than (or greater than or equal to, in another embodiment) the lower bound, then the number of write back indicators is increased.

Processing then continues with INQUIRY 302, in which a determination is made as to whether the error rate is still less than the first (success) threshold (or greater than a failure threshold). If not, then processing continues with INQUIRY 310, in which a determination is made as to whether the error rate (e.g., 20% in this particular example) is less than (or less than or equal to, in another embodiment) a second (failure) threshold (e.g., upper bound threshold). For instance, if there are fewer than one error in six transmissions (failure threshold of 16%), then the receiver controller signals the transmitter controller to decrease the number of write back indicators, STEP 312. That is, the transmitter controller resets at least one write back indicator. The indicator(s) to be reset is determined by the transmitter controller and depends on, for instance, the total number of indicators to be set and a preferred spacing between acknowledgements. Processing then continues with INQUIRY 310. However, if the error rate is not less than the second threshold, then processing ends.

In a further embodiment, the upper bound threshold may be based on successes, instead of failures. In this case, the success rate (e.g., 80% in this particular example) is compared to the upper bound threshold (e.g., 84% in this example). If the success rate is greater than (or greater than or equal to, in one example) the upper bound threshold, then the number of write back indicators is decreased.

In one embodiment, the adjustment of the number of write back indicators for a frame may result in adjustment of one or more indicators in the frame to appropriately space out the set indicators, and therefore, the acknowledgments. For instance, assume there are 12 packets in a frame and 3 indicators are set: one at packet 4, one at packet 8 and one at packet 12. Further assume that an additional indicator is to be set, so that there will be 4 indicators for the 12 packets. In this example, to appropriately space the indicators (e.g., even spacing), indicators are set at packet 3, packet 6, packet 9 and packet 12. Thus, the previously set indicators at packet 4 and packet 8 are reset.

Similarly, if the adjustment is to reduce the number of set indicators by one, such that there are 2 set indicators for the 12 packets, then, in one example, indicators are set at packet 6 and at packet 12, and thus, the previously set indicators at packet 4 and 8 are reset. Although in these examples the spacing is even spacing, other desired spacing may be used.

The above logic of FIG. 3 may be processed at predefined intervals, and enables the number of acknowledgments to be dynamically adjusted based on current system conditions.

In a further embodiment, one or more of the thresholds may be dynamically adjusted based on system conditions. For instance, the receiver controller considers various system criteria, including, for instance, system performance, error rate, etc., STEP 400. Based on the criteria, a determination is made as to whether the first threshold is to be adjusted, INQUIRY 402. That is, a determination is made, based on the system criteria, whether the lower bound threshold should be, for instance, higher than 75% or lower than 75%. For example, if the total overhead for sending an acknowledge with respect to transmittal packets were to decrease (e.g., larger transmittal packets are to be sent), then the thresholds could be increased resulting in more acknowledges per packet since the relative cost of acknowledges are to decrease. Likewise, if the overhead cost of acknowledge packets increases (e.g., transmittal packet size decreases), the thresholds can be reduced, reducing the number of acknowledge packets at a given fail rate, since the relative cost of the acknowledge packets are to increase. This allows the system to be dynamically reconfigured for optimal system performance. Other factors, for example, frame latency and bus utilization, may be used as factors in determining optimal threshold values for a system at a given moment.

If the first threshold is to be adjusted, then it is dynamically adjusted (i.e., while the system is processing) by the receiver controller based on the determination, STEP 404. Thereafter, or if it is determined that the first threshold is not to be adjusted, then a further determination is made as to whether the second threshold (e.g., upper bound) is to be adjusted, INQUIRY 410. Again, this determination is made based on current system criteria. If the second threshold is to be adjusted, then it is adjusted, STEP 412. Thereafter, or if it is determined that the second threshold is not to be adjusted processing of this logic is complete.

As described above, based on the error rate on the bus in question, the number of write back indicators that are set during frame transmittal is determined. This setting is dynamically controlled by the hardware controller organizing the packets in the hardware queue for transmittal. If the error rate increases due to, for instance, local heating effects, system noise, or other factors that can result in packet errors, the number of write back indicators per frame is increased, in one example.

In one embodiment, a plurality of packets are sent to a receiver, and each packet includes an indicator (e.g., a bit) for indicating whether an acknowledgement is required. When the receiver sees the indicator is enabled (e.g., set to 1), the receiver sends an acknowledgment for all the packets received after the previous packet having the indicator enabled and the current packet.

Figure 5:
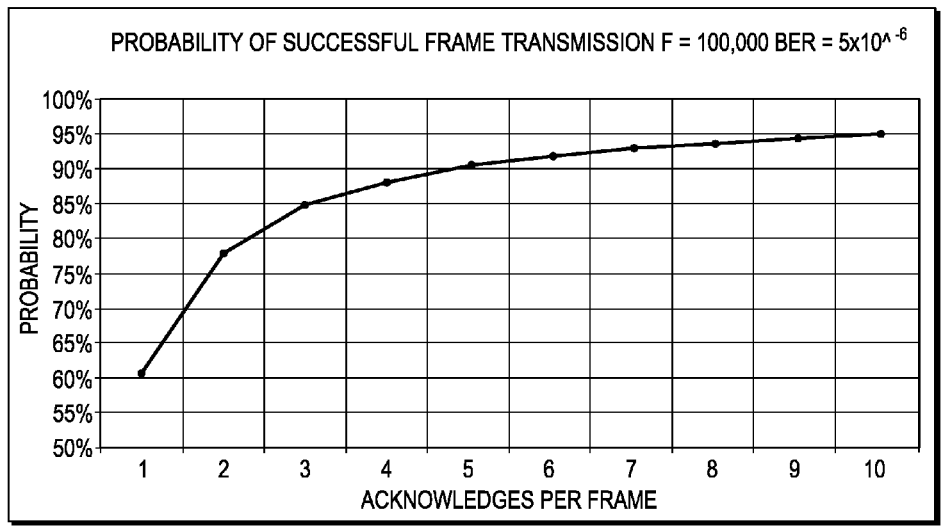
FIG. 5 depicts one example of a graph showing the probability of successful frame transmission, in accordance with an aspect of the present invention.

FIG. 5 depicts one example of a graph showing the probability of successful transmission of a frame having 100,000 bits and a bit error rate of 0.000005 ($5 \times 10^{-6}$). As shown, the Y axis includes the probability that a frame is successfully sent, and the X axis includes the number of acknowledges per frame.

Figure 6:
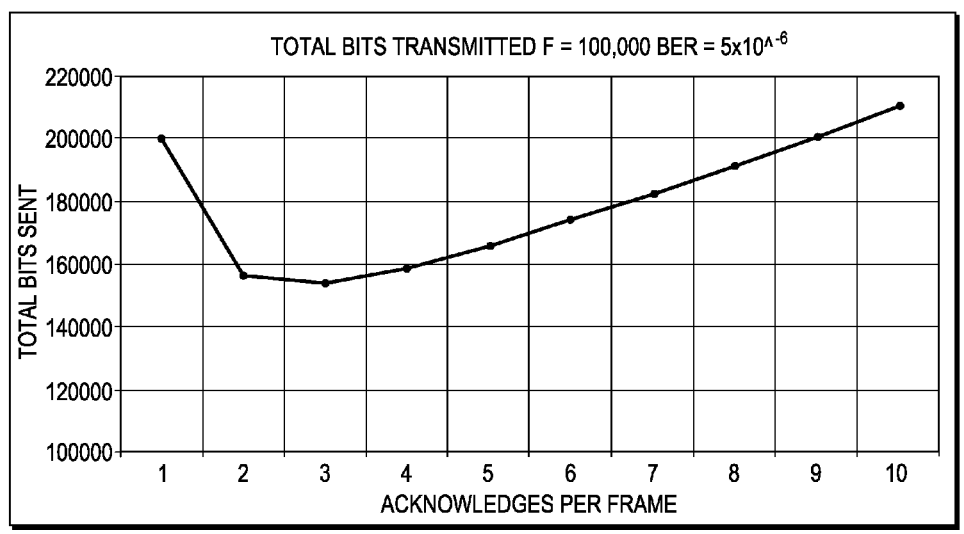
FIG. 6 depicts one example of a graph showing a total number of bits to be transmitted for various number of acknowledges per frame, in accordance with an aspect of the present invention.

Further, FIG. 6 depicts one example of the total bits transmitted for the various number of acknowledges under the circumstances of FIG. 5. The graph shows that the minimum number of bits sent is found using three acknowledges per frame, given that there is a 10,000 bit overhead per acknowledge. This point balances the need to retransmit large blocks of data that took an error with the need to transmit an increasing number of acknowledge packets.

In a further embodiment, to further reduce bus contention when an error occurs, an option may be used where the acknowledges sent from the receiver to the transmitter can contain one or more error indicators, and each error indicator includes a packet ID. These packet IDs include the packet number of the frame sent from the transmitter to the receiver such that only the packet or packets in error require re-transmittal. A frame error indicator is used to indicate that more packet errors occurred than available error slots in the acknowledge packet or that a packet was dropped entirely and the frame segment sent since the last acknowledge is to be totally sent.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
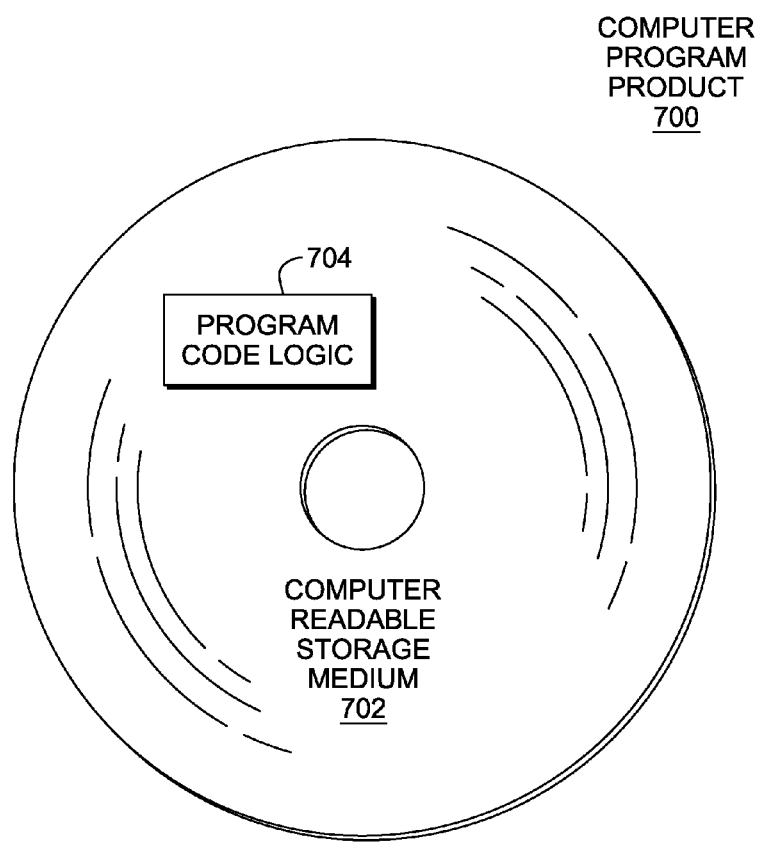
FIG. 7 depicts one embodiment of a computer program product incorporating one or more aspects of the present invention.

Referring now to FIG. 7, in one example, a computer program product 700 includes, for instance, one or more non-transitory computer readable storage media 702 to store computer readable program code means or logic 704 thereon to provide and facilitate one or more aspects of the present invention.

Program code embodied on a computer readable medium may be transmitted using an appropriate medium, including but not limited to, wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For instance, computing environments of other architectures and/or other types of computing environments can incorporate and use one or more aspects of the present invention. Further, other thresholds may be used and the criteria used to determine the thresholds may be different than described herein. Additionally, the thresholds may be different than percentages. Many other changes may also be made.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

As a further example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of facilitating communications in a computing environment, said method comprising:
    obtaining, by a hardware controller, an indication that an amount of set write back indicators of a data frame is to be adjusted, the indication based on an error rate of data transmission over a communication bus of the computing environment; and
    adjusting one or more write back indicators based on obtaining the indication.

2. The method of claim 1, wherein the adjusting comprises setting at least one write back indicator of the one or more write back indicators.

3. The method of claim 2, wherein a set write back indicator indicates that an acknowledge packet is to be sent indicating whether an error has occurred in a packet since a last acknowledge packet was sent.

4. The method of claim 2, wherein more than one write back indicator is adjusted, and wherein the adjusting further comprises resetting at least one write back indicator of the one or more write back indicators.

5. The method of claim 1, wherein the adjusting comprises resetting at least one write back indicator of the one or more write back indicators.

6. The method of claim 1, wherein the hardware controller comprises a transmitter hardware controller, and wherein the obtaining comprises receiving the indication from a receiver hardware controller based on the receiver hardware controller comparing the error rate with at least one threshold to determine that the amount of set write back indicators is to be adjusted.

7. The method of claim 6, wherein the at least one threshold comprises a lower bound threshold, and the indication is obtained based on the error rate being at a predefined level with respect to the lower bound threshold.

8. The method of claim 7, wherein the predefined level is below the lower bound threshold, and the lower bound threshold represents successes.

9. The method of claim 6, wherein the at least one threshold comprises an upper bound threshold, and the indication is obtained based on the error rate being at a predefined level with respect to the upper bound threshold.

10. The method of claim 9, wherein the predefined level is below the upper bound threshold, and the upper bound threshold represents failures.

11. The method of claim 6, further comprising adjusting one or more thresholds of the at least one threshold based on one or more current system criteria.

12. A method of facilitating communications in a computing environment, said method comprising:
    determining, at a selected time by a hardware controller, based on an error rate of data transmission over a communication bus of the computing environment that a rate at which data received by the hardware controller is to be acknowledged is to be adjusted; and
    providing an indication by the hardware controller that the rate is to be adjusted.

13. A computer program product for facilitating communications in a computing environment, said computer program product comprising:
    a non-transitory computer readable storage medium readable by a processing circuit and storing instructions for execution by the processing circuit for performing a method comprising:
        determining, at a selected time by a hardware controller, based on an error rate of data transmission over a communication bus of the computing environment that a rate at which data received by the hardware controller is to be acknowledged is to be adjusted; and
        providing an indication by the hardware controller that the rate is to be adjusted.

* * * * *